3,437,684
3,5-DIMETHYL-4-α-ALLYL MERCAPTOPHENYL-N-METHYL CARBAMIC ACID ESTER

Rudolf Heiss, Willi Halin and Wolfgang Behrenz, Cologne-Stammheim, and Günter Unterstenhöfer, Opladen, Germany, assignors to Farbenfabriken Bayer Aktiengesellschaft, Leverkusen, Germany, a corporation of Germany
No Drawing. Filed June 17, 1965, Ser. No. 464,834
Claims priority, application Germany, July 4, 1964,
F 43,353
Int. Cl. C07c *125/04*; A01m *9/12*
U.S. Cl. 260—479           1 Claim The present invention relates to particular alkenyl-mercaptophenyl-N-methyl carbamic acid esters, which have insecticidal and acaricidal properties, to their compositions and to the production and use thereof.

It is known that phenyl-N-methyl carbamic acid esters can be used for combating insects and mites. Some of these carbamic acid esters have already attained great importance in practice. The most important and most effective carbamic acid esters are believed to include α-naphthyl-N-methyl carbamic acid ester and 4-dimethyl-amino-3,5-dimethylphenyl-N-methyl carbamic acid ester.

It is also known that alkylmercaptophenyl-N-methyl carbamic acid esters have insecticidal and acaricidal activity (cf. British Patent No. 912,895). In this regard, the 3,5 - dimethyl - 4 - methylmercaptophenyl - N - methyl carbamate is considered to be especially effective.

It is an object of the present invention to provide particular alkenylmercaptophenyl - N - methyl carbamic acid esters having valuable properties.

It is another object of the present invention to provide such alkenylmercaptophenyl - N - methyl carbamic acid esters possessing strong insecticidal and acaricidal properties.

It is another object of the present invention to provide 3,5-dilower alkyl - 4 - alkenylmercaptophenyl-N-methyl carbamic esters which possess not only strong insecticidal and acaricidal properties but also a high degree of stability to lime and which retain their effectiveness for comparatively long periods of time.

It is still another object of the present invention to provide 3,5 - dilower alkyl - 4 - alkenylmercaptophenyl-N-methyl carbamic esters which possess a markedly low degree of toxicity toward warm-blooded animals as well as a markedly low phytotoxicity.

It is still another object of the present invention to provide 3,5-$C_1$-$C_4$ alkyl - 4 - propen - (2) - yl - mercapto - phenyl - N - methyl carbamic acid esters and 3,5 - $C_1$-$C_4$ alkyl - 4 - buten - (2) - yl - mercapto-phenyl-N-methyl carbamic esters, which possess strong insecticidal and acaricidal properties, which are effective even against those mite strains which have already developed a resistance to known carbamates, which are active against strains of insects and acarids which are resistant to phosphoric acid esters, which possess a high degree of stability to lime, which retain their effectiveness for long periods of time, which possess a markedly low toxicity toward warm-blooded animals as well as a markedly low phytotoxicity, and which exhibit their action rapidly, and which thus are eminently suitable for general hygiene purposes and crop control purposes, especially when applied to surfaces, substrates, agricultural crops and vicinal soil in pesticidally, especially insecticidally and acaricidally, effective amounts.

It is a still further object of the present invention to provide a process for the production of alkenyl-mercaptophenyl - N - methyl carbamic acid esters in a versatile and efficient manner and in comparatively high yields.

It is still another object of the present invention to provide such a process which contemplates reacting methyl isocyanate with a 3,5-dilower alkyl-4-alkenyl-mercapto - phenol whereby to produce the corresponding 3,5-dilower alkyl-4-alkenylmercaptophenyl-N-methyl carbamate ester.

It is still another object of the present invention to provide such a process in the presence or absence of solvents or diluents, and/or in the presence or absence of a reaction accelerator, at a reaction temperature within a fairly wide range including temperatures below room temperature as well as elevated temperatures.

It is still another object of the present invention to provide such a process utilizing as the starting phenols new phenol compounds produced by the formation of 3,5 - dialkyl - 4 - thiocyanatophenols from the corresponding dialkyl phenols, followed by the formation of the corresponding 3,5 - dialkyl - 4 - alkenylmercapto-phenols therefrom.

It is a further object of the present invention to provide compositions or formulations of the foregoing alkenyl - mercaptophenyl - N - methyl carbamic acid esters with carrier vehicles, such as dispersible carrier liquids and dispersible carrier solids, with the particular alkenylmercaptophenyl - N - methyl carbamic acid esters being present in a pesticidally, especially insecticidally and acaricidally, effective amount.

It is a still further object of the present invention to provide a method of combating pests, such as insects and acarids, by applying to such pests, i.e., insects or acarids, a biocidally effective amount of alkenylmercaptophenyl-N-methyl carbamic acid ester of the instant type, alone or in admixture with a dispersible carrier vehicle of the foregoing type.

It is a still further object of the present invention to provide a method of combating mite strains which have already developed a resistance to known carbamates, and/or of combating pest strains which are resistant to phosphoric acid esters and/or of providing hygiene control and/or crop control with rapid effectiveness and long lasting effectiveness, which contemplates applying to such pests as the case may be, and their habitat, including interior and exterior walls, surfaces, substrates, such as limed walls and walls of concrete or cement, and including agricultural plant crops and their vicinal soil, as the case may be, a biocidally or pesticidally effective amount of an alkenylmercaptophenyl-N-methyl carbamic acid ester of the foregoing type.

Other and further objects of the present invention will become apparent from a study of the within specification and accompanying examples.

It has been found in accordance with the present invention that alkenylmercaptophenyl-N-methyl carbamic acid esters of the general formula:

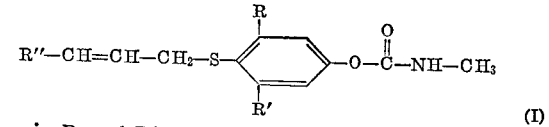

(I)

wherein R and R', which may be the same or different, represent lower alkyl radicals and R'' represents a hydrogen atom or a methyl radical, possess strong insecticidal and acaricidal properties.

The particular new carbamic acid esters of general Formula I are obtained in accordance with the present invention, when a phenol of tne general formula:

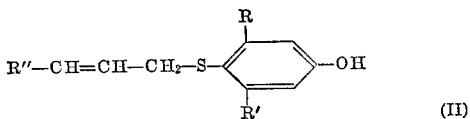

wherein R, R' and R'' have the same meanings as noted above, is reacted with methyl isocyanate.

Surprisingly, the carbamic acid esters according to the present invention have a higher insecticidal and acaricidal activity than the previously known biocidal carbamic acid esters. It is particularly surprising that the new carbamic acid esters of the invention are effective even against those mite strains which have already developed a resistance to the known carbamates. They are also active against strains which are resistant to phosphoric acid esters. Another surprising property of the new carbamates is their high degree of stability to lime which renders them very suitable for combating generally hygiene pests, since they retain their effectiveness for a long time on substrates such as limed walls, and walls of concrete or cement.

The phenols to be used as starting materials in accordance with the present invention are clearly characterized by general Formula II above. In this formula, R and R' represent lower alkyl radicals, such as in particular methyl, ethyl, n-propyl, isopropyl or butyl radicals, and the correspondingly substituted propenylmercapto- or butenylmercapto- phenyl-N-methyl carbamic acid ester will be produced in accordance with the instant process.

These starting phenols have not previously been described. Such starting phenols can, however, be prepared in a simple manner by known methods, when appropriate dialkylphenols are reacted with sodium thiocyanate and bromine, in the presence of solvents, such as methanol, acetone or glacial acetic acid, at temperatures substantially between about −20 and +10° C., the corresponding 3,5 - dialkyl - 4 - thiocyanatophenols thereby being formed. These thiocyanato phenols are then reacted with an appropriate unsaturated alcohol at temperatures substantially between about 80 and 160° C., using an excess of alcohol as solvent. The desired alkenylmercaptodialkylphenols are thus formed.

In accordance with a specific embodiment of the present invention, the course of the reaction thus may be illustrated by the following equation:

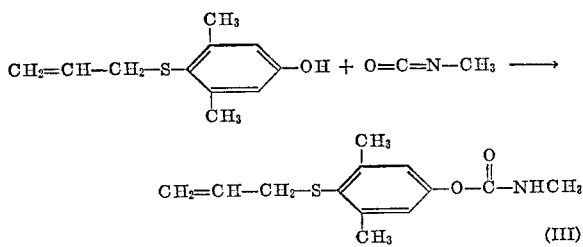

The reaction in accordance with the present invention can be carried out effectively in an inert solvent and/or the reaction may be accelerated by the addition of a tertiary amine, especially for example triethylamine. However, it is also possible in accordance with the present invention to react the components directly, in the absence of a solvent and/or in the absence of a reaction accelerator.

As such solvents or dispersing agents, there may be used in accordance with the present invention all inert organic solvents, preferably hydrocarbons, such as aliphatic hydrocarbons, especially paraffins, including petroleum fractions such as benzine fractions having a boiling point between about 30 and 160° C., especially $C_5$–$C_9$ aliphatic hydrocarbons, and the like; cycloaliphatic hydrocarbons, such as cycloalkyl, and especially cyclo lower alkyl hydrocarbons, including cyclopentane, cyclohexane, and the like; aromatic hydrocarbons, and especially unsubstituted-, as well as mono-, di-, and tri-lower alkyl substituted-, and nitro substituted- mononuclear aryl hydrocarbons having 6 ring carbon atoms, including benzene, toluene, xylene, mesitylene, nitrobenzene, and the like; halogenated aliphatic hydrocarbons, and especially chlorinated aliphatic hydrocarbons, including chlorinated lower alkyl and lower alkenyl hydrocarbons and especially di-, tri-, and tetra-chloro substituted lower alkyl- and lower alkenyl-hydrocarbons, such as methylene chloride, chloroform, carbon tetrachloride, trichloroethylene, tetrachloroethane, and the like; halogenated aromatic hydrocarbons, such as halogen substituted mononuclear aryl hydrocarbons having 6 ring carbon atoms, including mono-, di-, and tri-chlorobenzene, and the like; ethers, such as open chain aliphatic ethers and cyclic aliphatic ethers, and especially di-$C_1$–$C_6$ lower alkyl ethers, including dimethyl ether, diethyl ether, methylethyl ether, diisopropyl ether, diisobutyl ether, and the like, as well as cycloalkyl ethers, including dioxan, furan, tetrahydrofuran, and the like; as well as mixtures of such solvents.

As will be appreciated, the reaction in accordance with the invention may be accelerated by the addition of a tertiary amine, such as triethylamine. Amines in general contemplated as such accelerators encompass heterocyclic amines, and especially cyclic amines having 6 ring members including at least one nitrogen atom, such as pyridine, as well as tertiary aliphatic amines, and especially tertiary alkyl amines, such as tri-$C_1$–$C_6$ lower alkylamines, and especially trimethylamine, triethylamine, diethylmonomethylamine, tripropylamine, tributylamine, methylethyl-propylamine, diethyl-butylamine, dimethylcyclohexylamine, and the like, such tri-$C_1$–$C_6$ lower alkylamines thus contemplating those amines having various straight and branched chain substituents, including methyl, ethyl, n-propyl, isopropyl, n-butyl, isobutyl, sec.-butyl, tert.-butyl, the amyls, and the hexyls, as well as $C_5$–$C_6$ cyclolower alkyl substituted amines, including cyclopentyl, cyclohexyl, and the like, and corresponding mixed dialkyl-monocycloalkyl substituted- and monoalkyl-dicycloalkyl substituted- amines wherein the alkyl substituent or substituents and the cycloalkyl substituent or substituents contemplate the foregoing enumerated substituents; and mixtures of such amines.

The reaction temperatures which may be used in accordance with the instant invention may be varied conveniently within a fairly wide range. In general, the process for producing the instant compounds may be carried out at a temperature substantially between about 0 and 150° C.

The particular new compounds according to the present invention, while advantageously having a markedly low toxicity toward warm-blooded animals and a markedly low phytotoxicity, significantly exhibit strong insecticidal and acaricidal actions or effects. The biocidal or pesticidal effects appear rapidly and are long lasting. Accordingly, the compounds of the present invention can be used advantageously with extremely good results for combating noxious sucking and biting insects, Diptera and mites. The instant compounds because of their good compatibility with higher plants are also particularly useful as plant protective agents, such as in the case where such plants are blighted by various pests or insects.

In this connection, typical sucking inserts essentially include aphids, such as the peach aphid (Myzus persicae), the black bean aphid (Doralis fabae); coccids, such as Aspidiotus hederae, Lecanium hesperidum, Pseudococcus maritimus; Thysanoptera, such as Hercinothrips femoralis; and bugs, such as the beet leaf bug (Piesma quadrata), and the bed bug (Cimex lecularius); and the like.

Typical biting insects herein contemplated essentially include butterfly larvae, such as Plutella macullipennis, and Lymantria dispar; beetles, such as grain weevils (*Calandra granaria*), the Colorado beetle (*Leptinotarsa decemlineata*), and also species living in the soil, such as wire worms (*Agriotes sp.*) and cockchafer larvae (*Melolontha melolontha*); cockroaches, such as the German cockroach (*Blattella germanica*); Orthoptera, such as the cricket (*Gryllus domesticus*); termites, such as *Reticulitermes*; and Hymenoptera, such as ants; and the like.

Also, the Diptera especially comprise flies, such as the banana fruit fly (*Drosophila melanogaster*), the fruit fly (*Ceratitis capitata*), the house fly (*Musca domestica*); and gnats, such as the mosquito (*Aëdes aegypti*); and the like.

Especially important among the mites under consideration herein are the spider mites (*Tetranychidae*), such as the common spider mite (*Tetranychus telarius*) and the fruit tree spider mite (*Paratetranychus pilosus*); gall mites, such as the red current gall mite (*Eriophyes ribis*), and *Tarsonemides*, such as *Tarsonemus pallidus*; and ticks; and the like.

Because of their good stability to alkali, the new alkenylmercaptophenyl-N-methyl carbamic acid esters of the present invention are especially well suited for combating the generally regarded hygiene pests which are usually found in stables, dwellings and storage rooms. In the same way, because of their comparatively good compatibility with higher plants, the instant compounds may be used with advantage as plant protective agents, for example, to protect such plants against pests of the above noted types. The low degree of mammalian toxicity as compared with the high degree of pesticidal activity of the instant compounds renders such compounds extremely well suited to handling and manipulation in preparing formulations which may be used manually or by automatic equipment for applying the same to indoor and outdoor surfaces and substrates, including plants and surrounding soil, whereby to control and minimize advantageously the insect problem as it may occur in a given situation.

Thus, the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercial preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.001 and 10% by weight, and preferably 0.01 and 5% by weight, of the mixture. Thus, such mixtures overall contemplate an amount of the active compound which is effective for the purpose in question and which is generally between about 0.001 and 95% by weight of the mixture. Specifically, the active compound may be applied to indoor and outdoor walls, surfaces, substrates, and the like in concentrations substantially between about 0.1 and 5 grams, and preferably at about 1 gram, per square meter of surface area being treated. Thus, the instant formulations or compositions are applied in the usual manner, for example, by spraying, atomizing, vaporizing, scattering, and the like.

The following examples are given for the purpose of illustrating, while not limiting, the utility of the new compounds according to the present invention:

Example 1.—Tetranychus test

Solvent: 3 parts by weight acetone
Emulsifier: 1 part by weight alkylaryl polyglycol ether To produce a suitable preparation of the active compound, 1 part by weight of the particular active compound is mixed with the stated amount of solvent containing the stated amount of emulsifier, and the concentrate obtained is then diluted with water to the desired concentration.

Bean plants (*Phaseolus vulgaris*) which have a height of approximately 10–30 cm., are sprayed with the preparation of the given active material until dripping wet. These bean plants are heavily infested with bean spider mites (*Tetranychus telarius*, origin Tettnang, highly resistant to phosphoric acid esters and carbamates) in all stages of development.

After the specified periods of time, the effectiveness of the preparation of given active compound is determined by counting the dead pests. The degree of destruction thus obtained is given percentagewise. 100% indicates that all the spider mites are killed, whereas 0% indicates that none of them is killed.

The active compounds, their concentrations, the evaluation times and the results obtained can be seen from Table 1.

As may be seen from Table 1, the known Compound A. 3,5-methyl-4-methylmercapto-phenyl-N-methyl carbamic acid ester, possesses no activity whatsoever after an eight day test period while the known Compound B, 3,5-dimethyl-4-dimethylamino-phenyl-N-methyl carbamic acid ester, has effectiveness only at 0.05% concentration, and such effectiveness is only to a 75% degree. In contrast thereto, Compound III′ in accordance with the present invention possesses 100% effectiveness

TABLE 1.—PLANT-DAMAGING MITES

[*Tetranychus telarius*, resistant, origin Tettnang]

| Active compound | Concentration of active compound in percent | Degree of destruction in percent after 8 days |
|---|---|---|
| (A) $CH_3-S-\underset{CH_3}{\overset{CH_3}{C_6H_2}}-O-CO-NH-CH_3$ (known) | 0.05<br>0.02 | 0<br>0 |
| (B) $(CH_3)_2N-\underset{CH_3}{\overset{CH_3}{C_6H_2}}-O-CO-NH-CH_3$ (known) | 0.05<br>0.02 | 75<br>0 |
| (III') $CH_2=CH-CH_2-S-\underset{CH_3}{\overset{CH_3}{C_6H_2}}-O-CO-NH-CH_3$ | 0.05<br>0.02 | 100<br>100 | even at 0.02% concentration, i.e., at ⅖ths of the concentration at which Compound B is effective, whereas at 0.05% concentration the instant Compound III' exhibits a 33⅓% greater effectiveness as compared with that of known Compound B. In view of the poor results attainable using Compound A, it is completely surprising that instant Compound III', which also contains a 4-substituted mercapto moiety, possesses so great an effectiveness.

Example 2.—Residual test

Test insects: *Musca domestica*
Wettable powder base consisting of:

|   | Percent |
|---|---|
| Sodium diisobutyl-naphthalene-1-sulfonate | 3 |
| Sulfite waste liquor, partially condensed with aniline | 6 |
| Highly dispersed silicic acid, containing calcium oxide | 40 |
| Colloidal kaolin | 51 |

To produce a suitable preparation of the active compound, 1 part by weight of the particular active compound is intimately mixed with 9 parts by weight of the wettable powder base. The spray powder thus obtained is then suspended in 90 parts water.

The suspension of such active compound is sprayed, in an amount of 1 g. of active compound per square meter, onto various substrates.

The spray coatings are tested at definite time intervals for their biological activity.

For this purpose, the test insects are placed on the treated substrates. The test insects are covered with a squat cylinder, the upper end of which is closed with a wire mesh, in order to prevent the insects from escaping. After a residence time of 8 hours on the substrate, the knock-down effect is determined percentagewise.

The active compounds, the type of substrates and the results obtained can be seen from Table 2 as follows:

TABLE 2.—RESIDUAL TEST

[Knock-down effect on test insect *Musca domestica* in percent using limed clay as test substrate]

| Active compound | Age of residual coatings in weeks ||||||||
|---|---|---|---|---|---|---|---|---|
|  | 1 | 2 | 4 | 8 | 10 | 14 | 16 | 20 |
| (A) $CH_3-S-\underset{CH_3}{\overset{CH_3}{C_6H_2}}-O-CO-NHCH_3$ (known) | 30 |  |  |  |  |  |  |  |
| (C) $C_{10}H_7-O-CO-NHCH_3$ (known) | 50 |  |  |  |  |  |  |  |
| (III'') $CH_2=CH-CH_2-S-\underset{CH_3}{\overset{CH_3}{C_6H_2}}-O-CO-NHCH_3$ | 100 | 100 | 100 | 100 | 100 | 100 | 100 |  |

The results of Table 2 are indeed startling as the comparatively closely analogous known Compound A has little effectiveness after only one week of the test period, while the known Compound C, α-naphthyl-N-methyl carbamic acid ester, has only slightly better effectiveness after only one week of such test period. On the other hand, Compound III″ in accordance with the present invention, which possesses a 4-mercapto moiety, as is found in the analogous known Compound A, possesses 100% effectiveness not only after 1 week of the test period but also after even 16 weeks of such test period, i.e., about 4 months time. Considering the very favorable potency and effectiveness of the instant Compound III″ as compared with the results using the analogous known Compound A both as regard Table 1 and Table 2, it is seen that the compounds in accordance with the present invention are generally more desirable not only in terms of the better performance thereof at comparatively low concentrations but also in terms of the long lasting effect achievable therewith even after many weeks from the time of application, and even with resistant insect strains.

The following examples are given for the purpose of illustrating, while not limiting, the process for producing the active compounds in accordance with the present invention:

Example 3

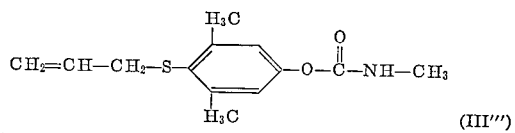

(III‴)

19.5 grams (0.1 mol) of 3,5-dimethyl-4-α-allylmercaptophenol are dissolved in 100 ml. of petroleum ether and mixed with 6.3 g. (0.11 mol) of methyl isocyanate and three drops of triethylamine. The reaction proceeds with a slight evolution of heat. After about 2 hours, the reaction product separates in the form of an oil which completely crystallizes after a short time.

Yield.—24.6 g. (98% of the theoretical of 3,5-dimethyl-4-α-allylmercapto-phenyl-N-methyl carbamic acid ester); M.P. 67° C.

The 3,5 - dimethyl - 4-α-allylmercaptophenol used as starting material is prepared in known manner for example using the following procedure:

1 mol of 3,5-dimethylphenol and 3 mols of sodium thiocyanate are dissolved in methanol and 1 mol of bromine is added dropwise, with stirring at −5° C. The reaction mixture is poured into water and the resultant 3,5-dimethyl-4-thiocyanatophenol is filtered off with suction; M.P. 128–129° C.

1 mol of sodium is dissolved in 400 g. of α-allyl alcohol and the solution stirred with 102.5 g. of 3,5-dimethyl-4-thiocyanatophenol in an autoclave at 120° C. for 3 hours. When the reaction mixture has cooled, it is poured into twice the amount of water. The crude 3,5-dimethyl-4-α-allylmercaptophenol separates upon acidification; B.P. 158–162° C./5 mm. Hg.

Example 4

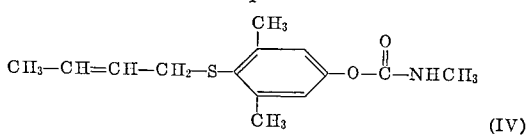

(IV)

20.8 grams (0.1 mol) of 3,5-dimethyl-4-crotylmercaptophenol (boiling point 158–160° C./4 mm. Hg—prepared in accordance with the procedure set forth in Example 3) are dissolved in 60 ml. ligroin and mixed with 6.3 g. (0.11 mol) of methylisocyanate and three drops of triethylamine, whereupon the reaction temperature increases to about 40° C. After 2 hours, the precipitated reaction product is filtered off with suction.

Yield.—25.2 g. (95% of the theoretical of 3,5-dimethyl - 4 - buten - (2) - yl - mercapto-phenyl-N-methyl carbamic acid ester); M.P. 73° C.

Example 5

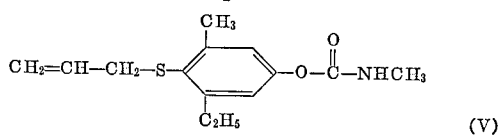

(V)

20.8 grams (0.1 mol) of 3-methyl-5-ethyl-4-α-allylmercaptophenol (boiling point 135–140° C./0.5 mm. Hg—prepared in accordance with the procedure set forth in Example 3) are dissolved in 60 ml. of ligroin and mixed with 6.3 g. (0.11 mol) of methyl isocyanate and three drops of triethylamine. When the very slight reaction heat has subsided, the mixture is heated to 60° C. and allowed to stand overnight. The solution is then washed with 2 N sodium hydroxide solution and subsequently with water to which a few drops of hydrochloric acid are added. After drying over anhydrous sodium acetate, the solvent is distilled off with the addition of benzene. The reaction product is obtained in the form of a colorless oil.

Yield.—21.8 g. (82% of the theoretical) of 3-methyl-5-ethyl-4-α-allylmercapto-phenyl-N-methyl carbamic acid ester.

Example 6

Example 3 is repeated using corresponding molar amounts of methyl isocyanate and each of the following mercaptophenyls, respectively:

3-methyl-5-(n-propyl to tert.butyl inclusive)-, 3,5-diethyl-, 3-ethyl-5-(n-propyl to tert.butyl inclusive)-, 3,5-di-n-propyl-, 3-n-propyl-5-(isopropyl to tert.butyl inclusive)-, 3,5-diisopropyl-, 3-isopropyl-5-(n-butyl to tert. butyl inclusive)-, 3,5-di-n-butyl-, 3-n-butyl-5-(isobutyl to tert. butyl inclusive), 3,5-diisobutyl-, 3-isobutyl-5-(sec. butyl and tert.butyl)-, 3,5-di-sec.butyl-, 3-sec.butyl-5-tert. butyl-, and 3,5-di-tert.butyl-4-α-allylmercapto- and -4-buten-(2)-yl-mercapto-phenol, whereby the corresponding -phenyl-N-methyl carbamic acid ester, as the case may be, is produced:

3-methyl-5-n-propyl-4-α-allyl-phenyl-N-methyl carbamate
3-methyl-5-isopropyl-4-α-allyl-phenyl-N-methyl carbamate
3-methyl-5-n-butyl-4-α-allyl-phenyl-N-methyl carbamate
3-methyl-5-isobutyl-4-α-allyl-phenyl-N-methyl carbamate
3-methyl-5-sec.butyl-4-α-allyl-phenyl-N-methyl carbamate
3-methyl-5-tert.butyl-4-α-allyl-phenyl-N-methyl carbamate
3-methyl-5-tert.butyl-4-α-allyl-phenyl-N-methyl carbamate
3,5-diethyl-4-α-allyl-phenyl-N-methyl carbamate
3-ethyl-5-n-propyl-4-α-allyl-phenyl-N-methyl carbamate
3-ethyl-5-isopropyl-4-α-allyl-phenyl-N-methyl carbamate
3-ethyl-5-n-butyl-4-α-allyl-phenyl-N-methyl carbamate
3-ethyl-5-isobutyl-4-α-allyl-phenyl-N-methyl carbamate
3-ethyl-5-sec.butyl-4-α-allyl-phenyl-N-methyl carbamate
3-ethyl-5-tert.butyl-4-α-allyl-phenyl-N-methyl carbamate
3,5-di-n-propyl-4-α-allyl-phenyl-N-methyl carbamate
3-n-propyl-5-isopropyl-4-α-allyl-phenyl-N-methyl carbamate
3-n-propyl-5-n-butyl-4-α-allyl-phenyl-N-methyl carbamate
3-n-propyl-5-sec.butyl-4-α-allyl-phenyl-N-methyl carbamate
3-n-propyl-5-tetra.butyl-4-α-allyl-phenyl-N-methyl carbamate
3,5-di-isopropyl-4-α-allyl-phenyl-N-methyl carbamate
3-isopropyl-5-n-butyl-4-α-allyl-phenyl-N-methyl carbamate
3-isopropyl-5-isobutyl-4-α-allyl-phenyl-N-methyl carbamate
3-isopropyl-5-sec.butyl-4-α-allyl-phenyl-N-methyl carbamate
3-isopropyl-5-tert.butyl-4-α-allyl-phenyl-N-methyl carbamate
3,5-di-n-butyl-4-α-allyl-phenyl-N-methyl carbamate
3-n-butyl-5-isobutyl-4-α-allyl-phenyl-N-methyl carbamate 3-n-butyl-5-sec.butyl-4-α-allyl-phenyl-N-methyl carbamate
3-n-butyl-5-tert.butyl-4-α-allyl-phenyl-N-methyl carbamate
3,5-diisobutyl-4-α-allyl-phenyl-N-methyl carbamate
3-isobutyl-5-sec.butyl-4-α-allyl-phenyl-N-methyl carbamate
3-isobutyl-5-tert.butyl-4-α-allyl-phenyl-N-methyl carbamate
3,5-di-sec.butyl-4-α-allyl-phenyl-N-methyl carbamate
3-sec.butyl-5-tert.butyl-4-α-allyl-phenyl-N-methyl carbamate
3,5-di-tert.butyl-4-α-allyl-phenyl-N-methyl carbamate
and the corresponding 3- and 5- substituted -4-buten-(2)-yl-phenyl-N-methyl carbamates.

All of the foregoing 3,5-dilower alkyl-4-lower alkenyl-phenyl-N-methyl carbamates, in accordance with the present invention, possess the desired strong insecticidal and acaricidal properties, as compared with known carbamates including 4-lower alkyl mercapto-substituted phenyl-N-methyl carbamates, even against those mite strains which have already developed a resistance to the known carbamates and even against those strains of insects and acarids which are resistant to phosphoric acid esters, also possess a high degree of stability to lime as well as a rapid action and a retention of effectiveness for long periods of time, and also possess a markedly low toxicity toward warm-blooded animals as well as a markedly low phytotoxicity, whereby the instant 4-lower alkenylmercapto-phenyl-N-methyl carbamic acid esters are eminently suitable for general hygiene purposes and crop control purposes, especially when applied to surfaces, substrates, agricultural crops and vicinal soil in pesticidally, especially insecticidally and acaricidally, effective amounts, either alone or in admixture with a dispersible carrier vehicle.

Accordingly, the present invention contemplates the use of the instant compounds not only per se but also in admixture with dispersible carrier vehicles and/or other active agents compatible therewith for combating pests, such as insects and acarids by applying to such pests, i.e., insects or acarids, a biocidally or pesticidally, especially insecticidally or acaricidally, effective amount of a compound of the type covered by Formula I hereinabove and most especially: 3,5-dialkyl-4-alkenylmercapto-phenyl-N-methyl carbamic acid esters having the formula

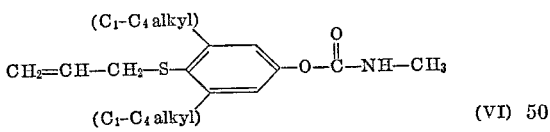

(VI)

and 3,5-dialkyl-4-alkenylmercapto-phenyl-N-methyl carbamic acid esters having the formula

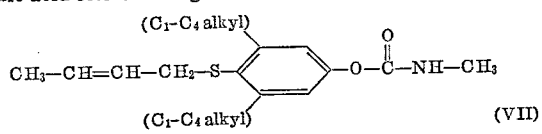

(VII)

Thus, the present invention provides for the utilization of the instant compounds for combating not only pests, such as insects and acarids, in general, but also those mite strains which have already developed a resistance to known carbamates and those pest strains which are resistant to phosphoric acid esters, and further provides for the utilization of the instant compounds for hygiene control and/or crop control, with rapid and long lasting effectiveness of the instant compounds. In practice, such compounds may be applied to various surfaces and substrates including interior and exterior walls, such as limed walls and walls of concrete or cement, as well as to agricultural plant crops and their vicinal soil, as the case may be.

In general, the instant compounds are usable on such surfaces, substrates, plants and soils, and the like, as the case may be, generally in dosages of substantially between about 0.1–5 grams, and preferably at about 1 gram, per square meter of surface area being treated.

The dosages contemplated herein are particularly effective per square meter of surface area being treated and provide advantageously a given quantity of the active compound, along and/or in admixture with a carrier vehicle, which may be handled readily by the consumer with a minimum of difficulty and which will be successful in achieving the hygiene control and/or crop control effectiveness desired, not only with rapid action but also over a long duration due to the favorable retention effectiveness of the instant compounds.

Obviously, where the instant active compound is used in admixture with a carrier vehicle, the dosage of 0.1–5 grams will represent 0.1–95% by weight of the mixture with the carrier vehicle, whereby in use a particular surface being treated will still be exposed to the desired quantity of 0.1–5 grams per square meter of such surface.

It will be appreciated that the instant specification and examples are set forth by way of illustration, and not limitation, and that various modifications and changes may be made without departing from the spirit and scope of the present invention which is to be limited only by the scope of the appended claim.

What is claimed is:
1. 3,5 - dimethyl - 4-α-allyl mercapto-phenyl-N-methyl carbamic acid ester having the formula:

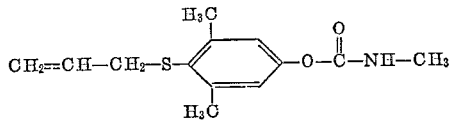

References Cited

UNITED STATES PATENTS
2,776,197  1/1957  Gysin et al. _____ 260—479

FOREIGN PATENTS
912,895  12/1962  Great Britain.

OTHER REFERENCES
Kolbezen et al., Journal of Agricultural and Food Chemistry, vol. 2, pp. 864–870 (1954).
Metcalf, Pest Control, vol. 30, pp. 20–28 (1962).

LORRAINE A. WEINBERGER, *Primary Examiner.*

M. G. BERGER, *Assistant Examiner.*

U.S. Cl. X.R.
424—300

U.S. DEPARTMENT OF COMMERCE

PATENT OFFICE

Washington, D.C. 20231

UNITED STATES PATENT OFFICE
CERTIFICATE OF CORRECTION

Patent No. 3,437,684                                  April 8, 1969

Rudolf Heiss et al.

It is certified that error appears in the above identified patent and that said Letters Patent are hereby corrected as shown below:

In the heading to the printed specification, line 4, "Willi Halin" should read -- Willi Hahn --. Column 10, line 63, "3-n-propyl-5-tetra.butyl-4-α-allyl-phenyl-N-methyl carbamate" should read -- 3-n-propyl-5-tert.butyl-4-α-allyl-phenyl-N-methyl carbamate --.

Signed and sealed this 7th day of April 1970.

(SEAL)
Attest:

Edward M. Fletcher, Jr.                      WILLIAM E. SCHUYLER, JR.

Attesting Officer                                  Commissioner of Patents